(12) United States Patent
Jones et al.

(10) Patent No.: US 12,221,884 B2
(45) Date of Patent: Feb. 11, 2025

(54) DETECTING DOWNHOLE FLUID COMPOSITION UTILIZING PHOTON EMISSION

(71) Applicant: Halliburton Energy Services, Inc., Houston, TX (US)

(72) Inventors: Christopher Michael Jones, Katy, TX (US); Jeffrey James Crawford, Katy, TX (US); Anthony Herman van Zulekom, Houston, TX (US); Darren George Gascooke, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 176 days.

(21) Appl. No.: 18/165,766

(22) Filed: Feb. 7, 2023

(65) Prior Publication Data

US 2023/0184108 A1 Jun. 15, 2023

Related U.S. Application Data

(63) Continuation of application No. 17/076,488, filed on Oct. 21, 2020, now Pat. No. 11,598,206.

(51) Int. Cl.
*G01N 23/223* (2006.01)
*E21B 49/08* (2006.01)

(52) U.S. Cl.
CPC .......... *E21B 49/08* (2013.01); *G01N 23/223* (2013.01); *G01N 2223/303* (2013.01); *G01N 2223/402* (2013.01); *G01N 2223/616* (2013.01); *G01N 2223/635* (2013.01)

(58) Field of Classification Search
CPC ..... E21B 49/08; E21B 49/081; G01N 23/201; G01N 23/223; G01N 23/222; G01N 2223/616; G01N 2223/635; G01N 2223/303; G01N 2223/402
See application file for complete search history.

(56) References Cited

U.S. PATENT DOCUMENTS

| 8,024,122 | B2 | 9/2011 | LeCompte et al. |
| 8,511,379 | B2 | 8/2013 | Spross et al. |
| 9,284,836 | B2 | 3/2016 | Rodney et al. |
| 9,334,727 | B2 | 5/2016 | Jones et al. |
| 10,012,074 | B2 | 7/2018 | Pomerantz et al. |

(Continued)

FOREIGN PATENT DOCUMENTS

EP 2028341 B1 12/2010

*Primary Examiner* — Jurie Yun
(74) *Attorney, Agent, or Firm* — John Wustenberg; Parker Justiss, P.C.

(57) ABSTRACT

This disclosure presents systems and processes to collect elemental composition of target fluid and solid material located downhole of a borehole. Waveguides can be utilized that include capillary optics to deliver emitted high energy into a container or a conduit and then to detect the high energy. A source waveguide can be used to emit the high energy into the target fluid and a detector waveguide can collect resulting measurements. Each waveguide can include a protective sheath and a pressure cap on the end of the capillary optics that are proximate the target fluid, to protect against abrasion and target fluid pressure. In other aspects, a pulsed neutron tool can be utilized in place of the waveguides to collect measurements. The collected measurements can be utilized to generate chemical signature results that can be utilized to determine the elemental composition of the target fluid or of the solid material.

23 Claims, 7 Drawing Sheets

(56) References Cited

U.S. PATENT DOCUMENTS

| | | |
|---|---|---|
| 2010/0230603 A1 | 9/2010 | Clothier et al. |
| 2014/0076551 A1 | 3/2014 | Pelletier et al. |
| 2017/0299828 A1 | 10/2017 | Bhongale et al. |
| 2020/0132527 A1 | 4/2020 | Kippersund et al. |

DETECTING DOWNHOLE FLUID COMPOSITION UTILIZING PHOTON EMISSION

CROSS-REFERENCE TO RELATED APPLICATION

This application is a continuation application of U.S. application Ser. No. 17/076,488, filed by Christopher Michael Jones, et al., on Oct. 21, 2020, entitled "DETECTING DOWNHOLE FLUID COMPOSITION UTILIZING PHOTON EMISSION," which is commonly assigned with this application and incorporated herein by reference in its entirety.

TECHNICAL FIELD

This application is directed, in general, to detecting fluid composition and, more specifically, to utilizing a protected waveguide to detect fluid composition under a fluid pressure.

BACKGROUND

When developing a borehole, such as when performing drilling operations, hydrocarbon production operations, scientific operations, or other types of operations, it may be beneficial to identify the elemental composition of the fluid from the formation or in the borehole. Changes in the fluid composition can be detected and that information can be utilized by other systems, such as to adjust an operation plan. The fluid can also be transported to a surface location, the fluid pressure can be reduced and various high energy techniques can be applied to detect the fluid composition. It would be beneficial to be able to perform the detection process downhole to minimize the delay from fluid collection to elemental detection and further allow real time operational decisions regarding the drilling or production process to be made. The pressure the downhole fluid experiences may require a container or a conduit, such as a fluid pipe, having a container or a conduit wall of at least a thickness that may effectively block high energy radiation from sufficiently penetrating the container or the conduit wall, thereby not allowing elemental composition detection. An apparatus and system that can effectively detect elemental composition using high energy sources when the fluid is under pressure would be beneficial.

SUMMARY

In one aspect an apparatus is disclosed. In one embodiment, the apparatus includes (1) a container, attached to a drill string or a downhole formation tester, wherein the container is located within a borehole, (2) a first fluid flow control device attached to the container to allow a target fluid to flow out of the container, (3) a radiant energy source, capable to generate an emission energy, (4) an energy detector, capable to detect the emission energy, and (5) a sheath at least in part positioned proximate the target fluid, wherein the sheath reduces high energy from outside of the container being detected within the container by the energy detector.

In a second aspect, a system is disclosed. In one embodiment, the system, includes (1) a container, capable of containing one or more target fluids, wherein the container is located downhole in a borehole, (2) a sheath, at least in part positioned proximate the one or more target fluids, capable of reducing an amount of high energy from atoms external to the sheath from reaching the one or more target fluids, (3) a detector system, capable of determining a chemical signature result of the one or more target fluids, (4) a source controller, capable of emitting a radiant energy, and (5) an energy detector, capable of detecting the radiant energy reflected off of the one or more target fluids as high energy measurements, wherein the energy detector is located within the container, and where the energy detector communicates the high energy measurements to the detector system.

In a third aspect, a method is disclosed. In one embodiment, the method includes (1) locating an energy detector internal of a container, wherein the container is located downhole a borehole, and the energy detector is operable to detect radiant energy, and the container is operable to hold one or more target fluids and the container includes a sheath at least in part proximate the one or more target fluids, where the sheath is operable to reduce an amount of the radiant energy from atoms external to the sheath from reaching the energy detector, (2) locating a source controller proximate the container, operable to generate the radiant energy, (3) detecting one or more measurements from the one or more target fluids using the energy detector and the source controller, and (4) generating a chemical signature result utilizing the one or more measurements, wherein the generating is performed by a detector system communicatively coupled to the energy detector.

BRIEF DESCRIPTION

Reference is now made to the following descriptions taken in conjunction with the accompanying drawings, in which.

DETAILED DESCRIPTION

As boreholes are developed, it can be beneficial to the operators to know the elemental composition of fluids present in the borehole. Boreholes can be used for hydrocarbon exploration and production purposes, such as a drilling well system, an injection well system, an extraction well system, and other hydrocarbon well systems, such as wireline logging, logging while drilling (LWD), measuring while drilling (MWD), seismic while drilling (SWD), telemetry while drilling (TWD), wireline, and hydraulic fracturing. Boreholes can be used for scientific and other purposes.

During the development (such as drilling) or production (such as pumping out) of a borehole, there can be one or more types of fluids present in the borehole or formation. The fluids, e.g., target fluids, can be one or more of a drilling fluid, a drilling fluid filtrate, a borehole fluid (e.g., fluid found in the borehole such as oil or gas), a formation fluid, a hydraulic fluid, fracturing fluid, brine, water, chemical additives, various muds, and other fluid types. The target fluids can be naturally occurring in the borehole or proximate to the borehole in subterranean formations, or the target fluids can be pumped from a tool located in the borehole or pumped from a surface location. For example, a drilling mud can be pumped from a surface location during drilling operations, a brine can be pumped from a surface location during an injection well operation, or a formation fluid may be pumped from the formation and into the borehole through a tool.

As the exploration, appraisal, development, or production of a reservoir contained by a formation intersecting a borehole, e.g., borehole operations, proceed the types of target fluids need to be measured for operational decisions. The fluids and their composition can change over time. The initial fluid conditions, e.g., state, compositions, and behavior, can be measured as well as the trajectory of change over time. For example, the reservoir fluid may have an initial gas to oil ratio and sulfur content, and the gas-oil ratio can change or the amount of sulfur present can change.

The information regarding the initial state can allow decisions to be made regarding how to drill the well, how, when, and where to sample the well, how to complete the well, or how to produce the well, such as if to complete the well. For example, with respect to how to drill the well, if a water-oil barrier is detected, then the operators can adjust the well controller operation plan to account for the borehole depth at which the water-oil barrier was encountered, such as altering the direction of a geo-steering system. The initial state can be measured in the open hole phase of drilling, such as before casing and cementing of the well section. The initial state can also be measured at the onset of oil production after completing the well.

Fluid measurements made during the open hole phase of wellbore construction can be made downhole utilizing tools conveyed by wireline, LWD, MWD, or other types of systems, such as formation testers, well testers, or drill stem testers. Alternatively, samples can be collected by a downhole tool and returned to the surface in containers for analysis. Under some circumstances such as, but not limited to, drill stem tests (DST), the fluid from an open hole section can be flowed to the surface through tubulars or pipes, and measured to determine the initial state. During the production phase of a well system, formation fluid composition in the formation can change, and therefore the fluid composition flowing into the borehole changes. These changes can be detected and then utilized by the operators to adjust operation plans.

To detect the elemental composition of the downhole target fluid, measurements can be taken at a surface location where the fluid pressure of the target fluid can be reduced allowing a sensor detection. Such detection can be a high energy sensor to perform the detection process. The high energy sources can be x-rays or gamma rays. A fluid under a low pressure can require a container or a conduit, such as a storage tank or a fluid pipe, with a wall thickness sufficiently thin to allow the high energy to penetrate the container or the conduit wall to perform the composition detection process. Alternatively the fluid can be accessed from the top of the container or the conduit where no wall inhibits the measurement. In a downhole location, the target fluid can be under a sufficiently high fluid pressure that would require the wall thickness of the container or the conduit to be sufficiently thick as to prevent the high energy from penetrating the container or the conduit wall. If the high energy cannot penetrate the container or the conduit wall then the detector system cannot measure elemental composition, or produce a fingerprint of aqueous formation fluid contamination levels. In some aspects, less than half a millimeter (mm) wall thickness can inhibit sufficient high energy transmission through the wall therefore quantifiably affecting the detected elemental composition of that contained fluid.

It would be beneficial for borehole operations to be able to detect fluid elemental composition at a downhole location where the target fluid is under a fluid pressure sufficient to require a container or a conduit wall thickness that would prevent high energy from penetrating the container or the conduit wall. Initial composition or changes in composition can be detected earlier than if the changes were detected by a surface based system. This can lead to a greater degree of operator decision optimizations and operation plan adjustment optimizations thereby improving the efficiency of the borehole operations and lowering borehole operation costs. Further, additional locations along a borehole can be measured thereby allowing a better formation evaluation of the prospective reservoir, than if the fluid were brought to the surface either by sampling or production.

This disclosure presents an apparatus, system, and methods that can implement a downhole elemental composition detection system of a target fluid. The detection system can utilize a capillary tubing waveguide that is protected against the fluid pressure of the target fluid to collect the measurements of the target fluid. The waveguide can be inserted through the container or the conduit wall so that a first end is external of the external diameter of the container or the conduit and a second end internal of the internal diameter of the container or the conduit. The first end can be coupled to a high energy source or a detector system. The second end can be proximate the target fluid and enable the collection of measurements of the elemental composition. In some aspects, the target fluid can be under a fluid pressure at various pressures, e.g., pounds per square inch (psi). Typically the fluid pressure is within a range of 1,000.0 psi to 20,000.0 psi, though in some aspects, the range can extend to over 40,000.0 psi. As is known in the art, the required thickness of the container or the conduit wall can depend on the material strength and the pressure with which it must hold. In some aspects, the target fluid can be contained within a container or a conduit having a container or a conduit wall thickness at various thicknesses, e.g., half a millimeter to a few millimeters (mm). In other aspects, the wall thickness can be larger than is necessary to accommodate pressure for reasons including, but not limited to, increased safety margin.

In some aspects, the processes described can generate a chemical signature result for a water based composition such as elements Na, K, Cs, Mg, Ca, Cl, Br, I, S, Hg, and other elements. In some aspects, the processes can generate a chemical signature result that provides a unique tracer, e.g., fingerprint, for water based pump outs, for example, to calculate contamination during formation testing sampling procedures. In some aspects, the processes can generate a chemical signature result that provides elemental composition of aqueous formation fluid, for example, for resistivity calculation or for pre-scaling composition. In some aspects, the processes can generate a chemical signature result that provides elemental composition of oil, for example, S, Ni, V, Fe, Co, Hg, and other elements.

In some aspects, the processes can a generate chemical signature result that specifies a bulk sulfur number, which can be used for example, for high concentration hydrogen sulfide early warning in sampling or which can be used, for example, for a low concentration sulfur inference measurement. In some aspects, an increase of sulfur throughout a formation tester pump out, such as when an asymptotic level of sulfur is measured, can be indicative of a flow line passivated with hydrogen sulfide, and can allow an actionable decision by an operator to acquire a downhole sample or adjust the operation plan. High levels of sulfur can be indicative of dangerous levels of hydrogen sulfide.

In some aspects, mercury can be directly monitored without inference as to the chemical nature of the mercury. Other operation plan decisions can be made using other elemental sampling. Asymptotic elemental change during a pumpout can be utilized for measurement of the initial formation fluid state compositional levels, or allow sampling decisions to be made with regard to either formation petroleum or formation water, where either can be in the presence of an oil based mud filtrate or a water based mud filtrate.

In some aspects, the processes can generate a chemical signature result that can track asymptotic sulfur increase, for example, to infer $H_2S$, or to monitor a lower bound 0.1 to 30.0 parts per million (ppm) in petroleum at a detector throughout a formation tester pump out process. In some aspects, the processes can generate a chemical signature result that can measure mercury and track a lower bound 3 ppm asymptotic mercury increase in petroleum at a detector throughout a formation tester pumpout process. In some aspects, the processes can generate a chemical signature result that can track formation composition and allow a comparison of the formation composition to the target fluid composition, at which an operational decision can be made. In some aspects, the processes can generate a chemical signature result that can track wellbore fluid salinity and elemental composition.

The disclosed processes can utilize a high energy source to generate the measurements for collection by the detector system. The high energy source can utilize x-rays or gamma ray emissions to characterize the elemental composition of the target fluid in a flow line, e.g., fluid pipe, container, or conduit, such as during a pump out operation. The high energy emissions can be induced by a high energy absorption of greater energy than that of the resultant emission that can provide elemental compositions with masses that of atomic number for sodium and above. For example, this disclosure can result in sulfur detection at a rate of 10.0 to 30.0 ppm. The disclosure can be effective linearly over a wide dynamic range of detection, for example, from ppm to a percentage range of an element in a target fluid.

For example, when a material is bombarded with x-rays in the 20-90 KeV range, K shell electrons can be excited such that the electrons are ejected from an atom. Rapidly, the L and M shell electrons can drop to fill the vacancy causing emission of lower energy x-rays characteristic to the energy of the L or M shells which are element specific. X-rays can be generated by bombarding a metal target, e.g., a silver target, with an electron beam. The energy of the emitted photons can be directly detected, such as using energy dispersive spectroscopy (EDS). The wavelength of the emitted photons can be detected, such as using wavelength dispersive spectroscopy (WDS). In some aspects, the energy of the excitation energy can be tuned to a single element. EDS can produce results that can have moderate accuracy while being very robust, where WDS can have higher accuracy with lower robustness. A WDS can require more delicate equipment than that of EDS and hence the lower robustness. WDS can have an increased optimization tuning for detection efficiency leading to a lower limit of detection, as compared to EDS. Further the WDS can detect a narrow peak distribution of energies thereby leading to an increased accuracy of elemental composition measurement.

The penetration depth of x-rays can be a few hundred micrometers in a solid and up to a millimeter in liquids, where the depth can vary exponentially to the sample density. When the target fluid is under a pressure, the container or the conduit wall thickness can be sufficiently thick that the x-rays cannot penetrate the container or the conduit wall. For example, a titanium container or conduit, such as a downhole fluid pipe, should have a wall thickness of 1.25 mm to hold the target fluid at a fluid pressure of 30.0 Kpsi.

To compensate for the container or the conduit wall thickness, a waveguide can be utilized, such as a 10.0 micrometer to 40.0 micrometer capillary tube. In some aspects, the waveguide can be sheathed to protect the capillary tubes from the fluid pressure and from abrasion from the target fluid. In some aspects, a sufficiently strong capillary tube can be unsheathed. Stainless steel is an example material that can be used as the protective sheath. In some aspects, the end of the waveguide that is exposed to the target fluid should be protected using a pressure cap while allowing the high energy to pass through with minimal interference or attenuation.

In some aspects, the pressure cap, e.g., end cap, of the waveguide can be a material that has a low atomic number, e.g., a low Z, to minimize the interference of the pressure cap as the high energy passes through the pressure cap. The pressure cap can be constructed of a chemically stable material. For example, pure metal foils used for the pressure cap can include gold, nickel, platinum, or other materials. Materials with a very low Z, such as aluminum, can be acceptable pressure cap materials though they may not be chemically stable in some chemical environments, e.g., high acetic or high caustic environments. Materials including, but not limited to, aluminum can be chemically stabilized with coatings such as, but not limited to, silicon carbide (SiC), aluminum oxide ($Al_2O_3$), diamond like coatings, or ceramics such as, but not limited to, Tech-12. The pressure cap can be located on the outside edge of the waveguide, flush with the waveguide, internal to the waveguide, or overlapping with the edge of the waveguide. The pressure cap can be a thickness sufficient to prevent the target fluid pressure from interfering or damaging the capillary tubes of the waveguide. The thickness can be determined using conventional pressure dynamics techniques, such as being a thickness on the order of the capillary size adjusted for the material strength of the pressure cap material.

Figure 1:
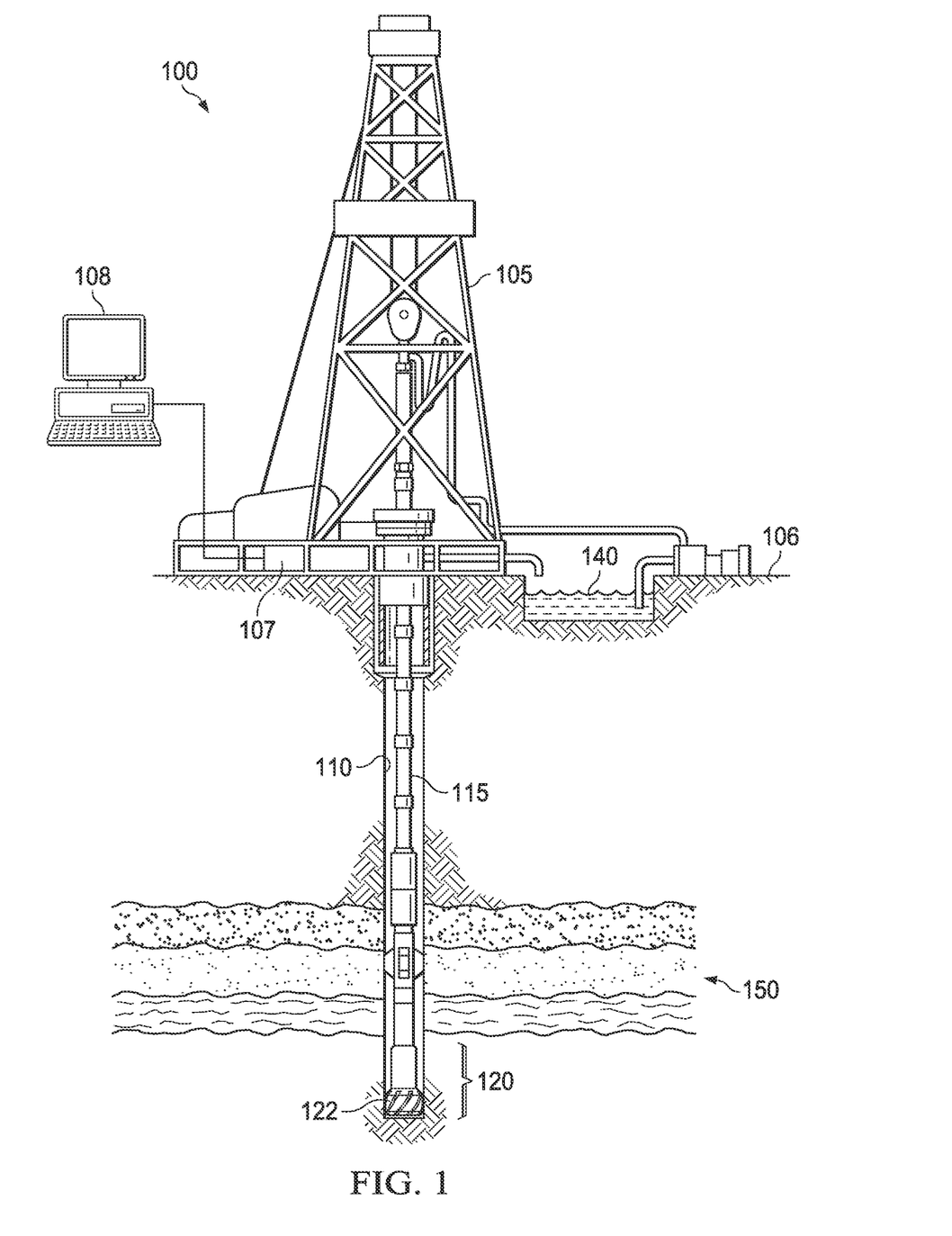
FIG. 1 is an illustration of a diagram of an example well system with sensors.

Turning now to the figures, FIG. 1 is an illustration of a diagram of an example well system 100 with sensors that can be utilized to collect measurements from detected high energy emissions, for example, wireline logging system, a drilling system, a LWD system, a MWD system, a SWD system, a TWD system, a wireline system, injection well system, extraction well system, and other hydrocarbon well systems. Well system 100 includes a derrick 105, a well site controller 107, and a computing system 108. Well site controller 107 includes a processor and a memory and is configured to direct operation of well system 100. Derrick 105 is located at a surface 106.

Extending below derrick 105 is a borehole 110 with downhole tools 120 at the end of a drill string 115. Downhole tools 120 can include various downhole tools, such as a formation tester or a bottom hole assembly (BHA). At the bottom of downhole tools 120 is a drilling bit 122. Other components of downhole tools 120 can be present, such as a fluid pipe coupled to an uphole fluid container or conduit, such as surface container or conduit 140, a local power supply (e.g., generators, batteries, or capacitors), telemetry systems, sensors, transceivers, and control systems. A detector system can be proximate various fluid conduits at a location along the fluid conduit length. The detector system can have one or more waveguides, e.g., a set of waveguides, positioned so that a first end is external of the external diameter of the fluid pipe and a second end is internal of the internal diameter of the fluid pipe. In other aspects, the fluid pipe can be fluid container or conduit, such as a storage container or conduit or a fluid tank. Borehole 110 is surrounded by subterranean formation 150.

Well site controller 107 or computing system 108 which can be communicatively coupled to well site controller 107, can be utilized to communicate with downhole tools 120, such as sending and receiving telemetry, data, instructions, subterranean formation measurements, and other information. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the processes described herein. Well site operators, engineers, and other personnel can send and receive data, instructions, measurements, and other information by various conventional means, now known or later developed, with computing system 108 or well site controller 107.

Well site controller 107 or computing system 108 can communicate with downhole tools 120 using conventional means, now known or later developed, to direct operations and receive the measurements from the sensors included with downhole tools 120. For example, in some aspects, the disclosed detector system can collect the measurements from high energy emissions and transmit the chemical signature results to well site controller 107 or computing system 108. In some aspects, the measurements taken, e.g., the original collected data, by the sensor electronics in the detector system can be communicated to well site controller 107 or computing system 108 and the chemical signature results generated in one or more of those respective systems.

Figure 2:
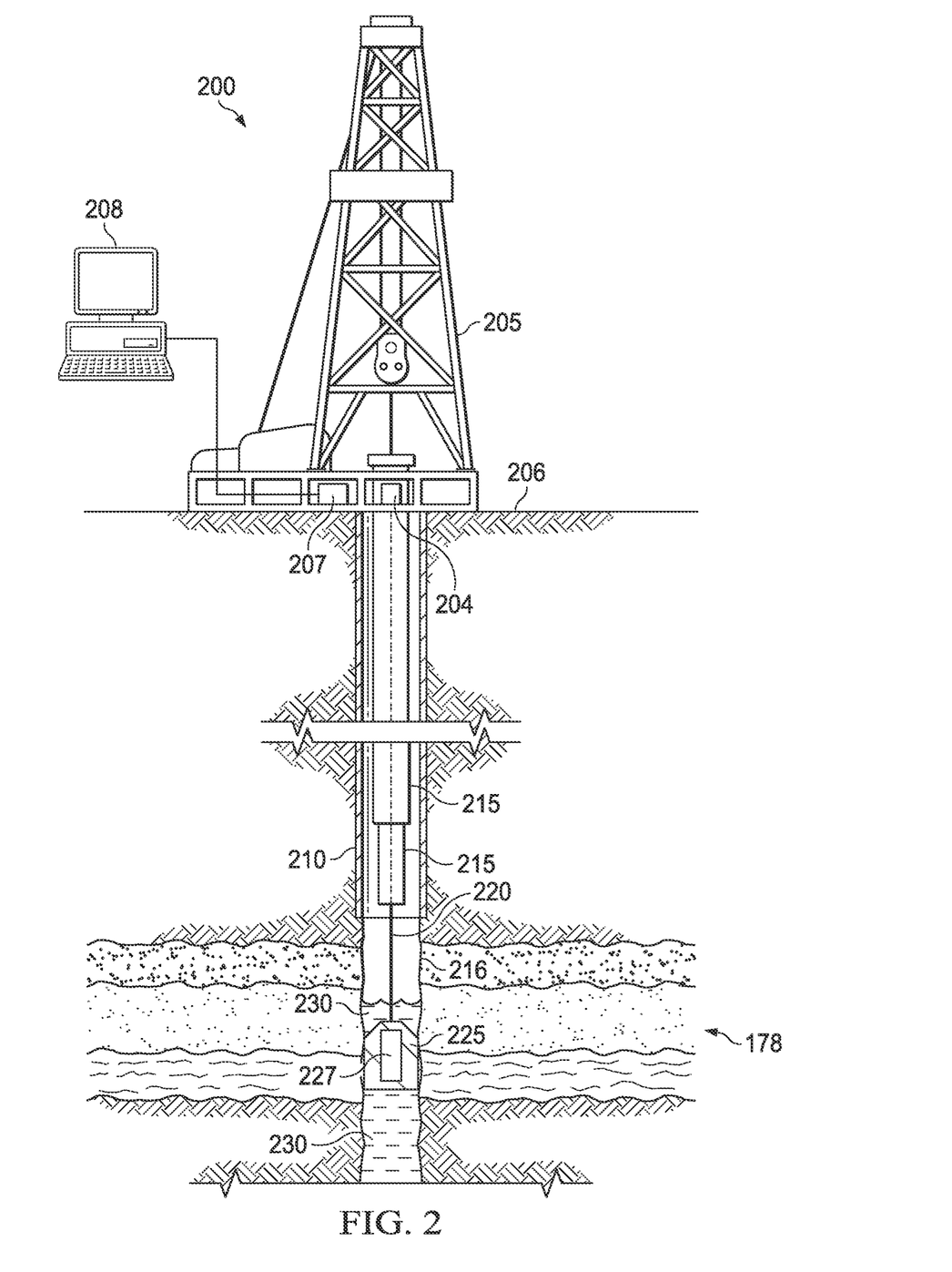
FIG. 2 is an illustration of a diagram of an example well system with an elemental composition detector system.

FIG. 2 is an illustration of a diagram of an example well system 200 with an elemental composition detection system. Well system 200 can be, for example, an extraction system, an injection system, a production system, a wireline system, other hydrocarbon well systems, or a combination of well systems. Well system 200 depicts a wireline well system and includes a derrick 205, a well site controller 207, and a computing system 208. Optionally, a surface pump system 204 can be included to provide fluid injection or extraction. Well site controller 207 includes a processor and a memory and is operable to direct operation of well system 200. Derrick 205 is located at a surface 206.

Extending below derrick 205 is a borehole 210, with two cased sections 215 and one uncased section 216. Wireline 220 is inserted in borehole 210 to hold a downhole tool 225. Borehole 210 is surrounded by a subterranean formation 235 which includes a hydrocarbon reservoir. A fluid 230 can be pumped into or out of the subterranean formation.

In some aspects, wireline 220 provides electric power and telemetry to operate a formation tester. The formation tester can contain a downhole pump to extract fluid and material from the subterranean formation through a probe (such as a packer or pad) that can make hydraulic contact with the formation. The pump can flush the formation by drawing far field fluid contained within the formation thereby displacing the near borehole zone which can be contaminated with drilling fluid filtrate as a consequence of the drilling process. Over time, the fluid pulled into the formation tester can grade from filtrate rich fluid into formation rich fluid. In some aspects, the formation tester can include a fluid pipe coupled to surface pump system 204 and coupled to downhole tool 225. Once a formation fluid of sufficient contamination level is observed by conduit sensors, the formation fluid can be diverted into a sample chamber and brought to the surface for analysis. Formation testers can be located on a wireline, a BHA, or drill stem testing equipment. Downhole tool 225 can include various downhole tools, formation testers, and BHA, such as one or more sensors 227. Other components of downhole tool 225 can be present, such as a local energy supply, or batteries and capacitors to store energy received from another system, as well as a transceiver and a control system.

Sensors 227 can include an elemental composition detector system, and include a container or a conduit to hold fluid 230, e.g., target fluid, to be measured by the detector system. In some aspects the detector system can utilize waveguides. In some aspects, the detector system can utilize a pulsed neutron tool. The container or the conduit can be a separate container or conduit from other downhole tools, be part of other downhole tools, such as fluidly coupled to other tools, or be the fluid pipe with wireline 220. In some aspects, sensors 227 can be a microprobe collimator that is attached to an extension probe allowing sensors 227 to be placed proximate subterranean formation 235. In some aspects, sensors 227 can include more than one type of sensor, for example, including one or more of waveguide detector systems attached to a fluid pipe, pulsed neutron detector systems with container or conduits, or microprobe collimators.

Computing system 208 or well site controller 207 can be utilized to perform the operations of the detector system after the initial measurements of the high energy emissions have been detected, for example, generating the chemical signature results and performing other analysis. Computing system 208 can be proximate well site controller 207 or be a distance away, such as in a cloud environment, a data center, a lab, or a corporate office. Computing system 208 can be a laptop, smartphone, PDA, server, desktop computer, cloud computing system, and other computing systems that are operable to perform the process and methods described herein. The information and results generated from computing system 208 can be communicated by various conventional means to well site controller 207 and to well site operators and engineers so the elemental composition can be used in modifying the well operation plan of well system 200.

Figure 3:
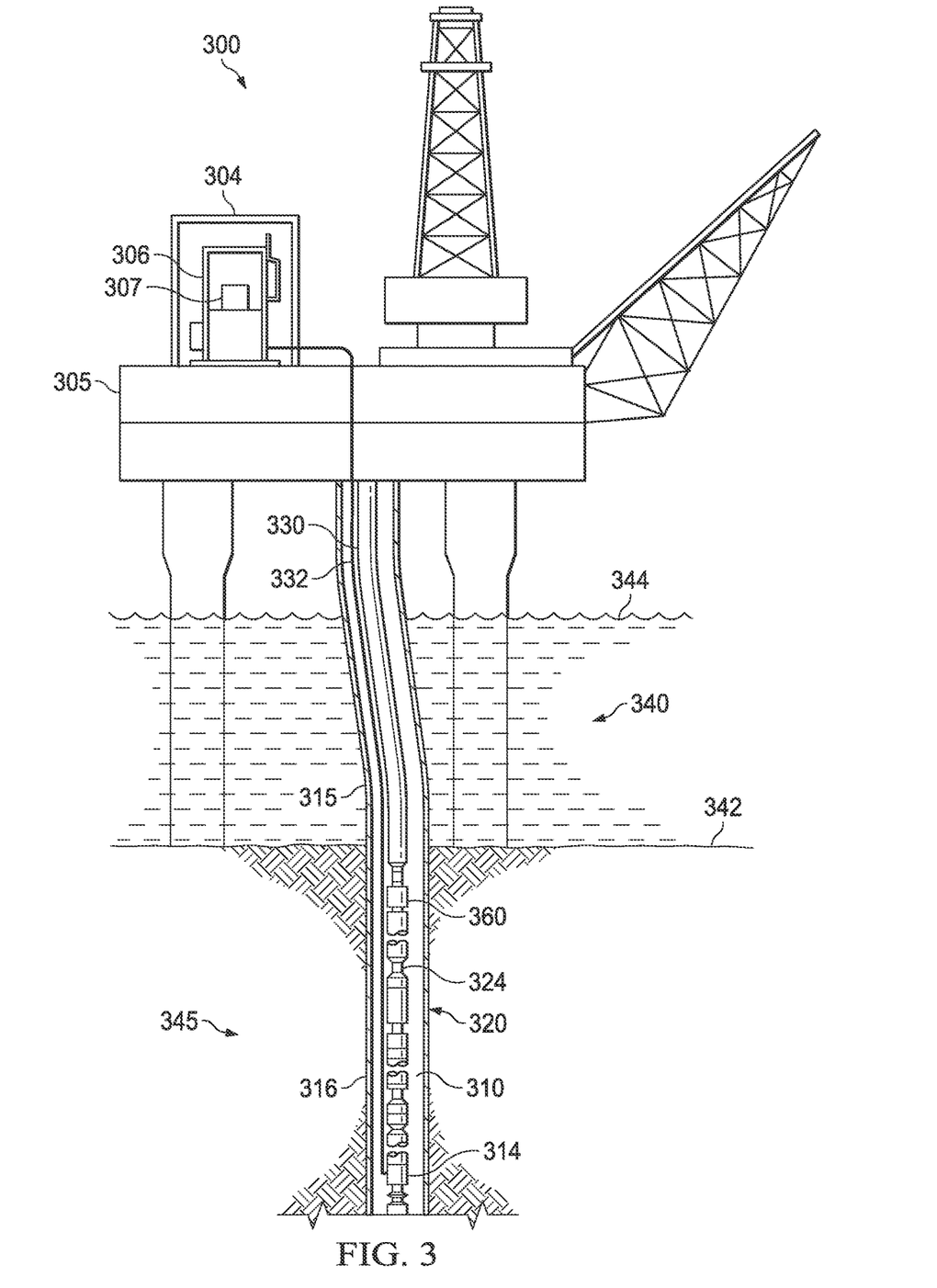
FIG. 3 is an illustration of a diagram of an example offshore well system with an electrical submersible pump (ESP)

FIG. 3 is an illustration of a diagram of an example offshore well system 300 with an electric submersible pump (ESP) assembly 320. ESP assembly 320 is placed downhole in a borehole 310 below a body of water 340, such as an ocean or sea. Borehole 310, protected by casing, screens, or other structures, is surrounded by subterranean formation 345. ESP assembly 320 can be used for onshore operations. ESP assembly 320 includes a well controller 307 (for example, to act as a speed and communications controller of ESP assembly 320), an ESP motor 314, and an ESP pump 324.

Well controller 307 is placed in a cabinet 306 inside a control room 304 on an offshore platform 305, such as an oil rig, above water surface 344. Well controller 307 is configured to adjust the operations of ESP motor 314 to improve well productivity. In the illustrated aspect, ESP motor 314 is a two-pole, three-phase squirrel cage induction motor that operates to turn ESP pump 324. ESP motor 314 is located near the bottom of ESP assembly 320, just above downhole sensors within borehole 310. A power/communication cable 330 extends from well controller 307 to ESP motor 314. A fluid pipe 332 fluidly couples equipment located on offshore platform 305 and ESP pump 324.

In some aspects, ESP pump 324 can be a horizontal surface pump, a progressive cavity pump, a subsurface compressor system, or an electric submersible progressive cavity pump. A motor seal section and intake section may extend between ESP motor 314 and ESP pump 324. A riser 315 separates ESP assembly 320 from water 340 until sub-surface 342 is encountered, and a casing 316 can separate borehole 310 from subterranean formation 345 at and below sub-surface 342. Perforations in casing 316 can allow the fluid of interest from subterranean formation 345 to enter borehole 310.

Offshore well system 300 is demonstrating an example where a detector system 360 is located downhole, along a portion of fluid pipe 332, as part of ESP assembly 320. As target fluid is pumped up to the surface, detector system 360 can collect measurements of the high energy emissions. In some aspects, detector system 360 can generate the chemical signature results. The measurements collected and the chemical signature results can be communicated to well controller 307. In other aspects, detector system 360 can be located on offshore platform 305.

FIGS. 1 and 2 depict onshore operations. Those skilled in the art will understand that the disclosure is equally well suited for use in offshore operations. FIGS. 1, 2, and 3 depict specific borehole configurations, those skilled in the art will understand that the disclosure is equally well suited for use in boreholes having other orientations including vertical boreholes, horizontal boreholes, slanted boreholes, multilateral boreholes, and other borehole types.

Figure 4A:
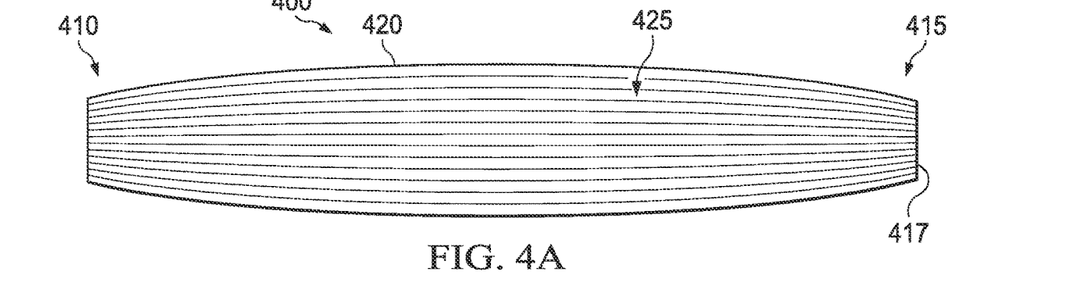
FIG. 4A is an illustration of a diagram of an example line drawing of a polycrystalline capillary waveguide.

FIG. 4A is an illustration of a diagram of an example line drawing of a polycrystalline capillary waveguide 400. Polycrystalline capillary waveguide 400 includes a first end 410, a second end 415, a pressure cap 417, a sheath 420, and one or more capillaries 425. Capillaries 425 can be utilized as focusing optics of the high energy and can be encased in a protective sheath, such as sheath 420, and caped with a thin film coating of metal or ceramic, such as pressure cap 417. For example, using conventional pressure barrier algorithms, an exposed area of second end 415 of 10.0 to 40.0 micrometers allows pressure cap 417 to hold back the fluid pressure of the target fluid while minimizing interference of the high energy. The pressure cap can be the same thickness as the inner diameter of the capillary tube, adjusted for the material strength of the pressure cap. Polycrystalline capillary waveguide 400 can be used to pass x-rays or gamma rays through the pressure housing, e.g., container or conduit wall, to the target fluid, and return the emitted x-rays or gamma rays from the target fluid to the detector system.

In aspects where polycrystalline capillary waveguide 400 is a source waveguide, first end 410 is coupled to a high energy source, such as an x-ray source or a gamma ray source. In aspects where polycrystalline capillary waveguide 400 is a detector waveguide, first end 410 is coupled to a detector system capable to collecting measurements from the high energy emissions. In some aspects, detector system is capable of communicating with other systems. In some aspects, detector system is capable of generating chemical signature results. First end 410 is located external of the external diameter of the container or the conduit holding the target fluid. Second end 415 is located internal of the internal diameter of the container or the conduit holding the target fluid. (See FIG. 5)

Pressure cap 417 is shown as mounted flush with second end 415. In other aspects, pressure cap 417 can be mounted internal of second end 415, mounted external of second end 415, or be mounted overlapping second end 415. Pressure cap 417 can be of various materials, such as metal or ceramic. It is preferred pressure cap 417 have a lower atomic Z to minimize interference with the high energy, such as using aluminum, nickel, gold, platinum, or other suitable materials. Sheath 420 is located external the body of polycrystalline capillary waveguide 400 to protect capillaries 425 from fluid pressure and fluid abrasion. Sheath 420 can be of various materials and does not have a restriction on the atomic Z of the material, for example, stainless steel can be utilized.

Figure 4B:
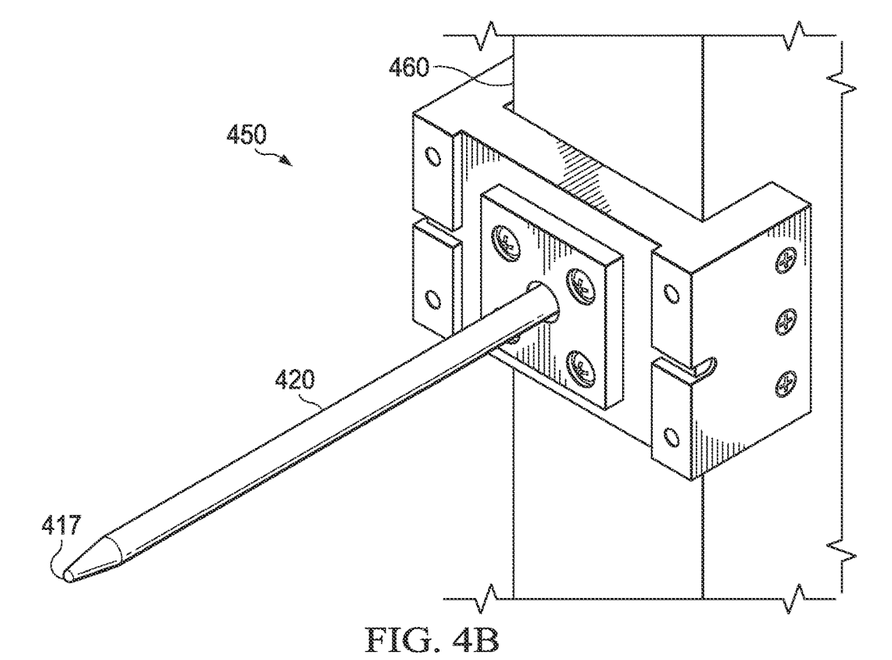
FIG. 4B is an illustration of a diagram of an example waveguide component.

FIG. 4B is an illustration of a diagram of an example waveguide component 450. Waveguide component 450 demonstrates a waveguide, such as polycrystalline capillary waveguide 400, attached to a component 460. In aspects where waveguide component 450 represents a source waveguide, then component 460 can be a high energy source, such as an x-ray source or a gamma ray source. Pressure cap 417 indicates where the high energy would be emitted into the target fluid.

In aspects where waveguide component 450 represents a detector waveguide, then component 460 can be a detector system capable of collecting measurements detected by the waveguide capillaries, as the high energy enters the capillary optics at the location indicated by pressure cap 417.

Figure 5:
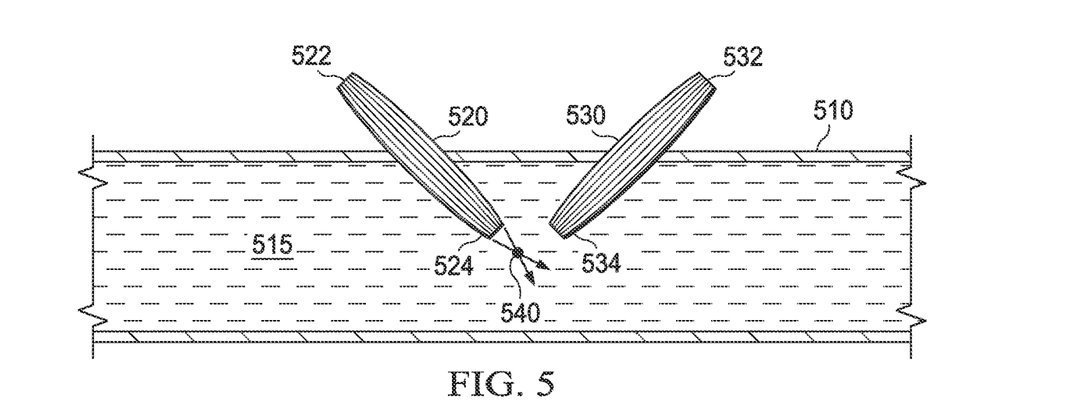
FIG. 5 is an illustration of a diagram of an example positioning of a source waveguide and a detector waveguide.

FIG. 5 is an illustration of a diagram of an example positioning 500 of a source waveguide 520 and a detector waveguide 530. Positioning 500 represents a fluid pipe 510, for example, a downhole pipe in a well system. Fluid pipe 510 can have a target fluid 515 flowing through it. In other aspects, fluid pipe 510 can be a container or a conduit, for example, a downhole collection container, conduit, pipe, or storage tank. In some aspects, source waveguide 520 can perform the functions of detector waveguide 530. In some aspects, there is one waveguide present.

Inserted through the wall of fluid pipe 510 are source waveguide 520 and detector waveguide 530. Source waveguide 520 has a first end 522 coupled to a high energy source and a second end 524 where a pressure cap is present and the high energy can be emitted into target fluid 515. Detector waveguide 530 has a first end 532 coupled to a detector system capable of collecting measurements, and in some aspects, generating chemical signature results. Detector waveguide 530 has a second end 534 where a pressure cap is present that can allow high energy to pass into detector waveguide 530. Source waveguide 520 and detector waveguide 530 can have a sheath protecting the waveguide capillaries from fluid pressure and abrasion by target fluid 515.

Focal point 540 represents an optimum location for the emitted high energy to interact with target fluid 515 and create energy that can be detected by detector waveguide 530. Positioning 500 is demonstrating that the second ends of the respective source waveguide 520 and detector waveguide 530 are proximate each other. In some aspects, the angle, e.g., orientation, formed by a line passing through the length of source waveguide 520 and a line passing through the length of detector waveguide 530 can be 45 degrees. Other angles can be utilized as well. The angle between source waveguide 520 and detector waveguide 530 can be adjusted to minimize fluorescence interference with the collected high energy by detector waveguide 530. The orientation of the focusing optics can minimize background interference from the pressure cap, such as in aspects where the focal point 540 is positioned distally within target fluid 515.

Figure 6:
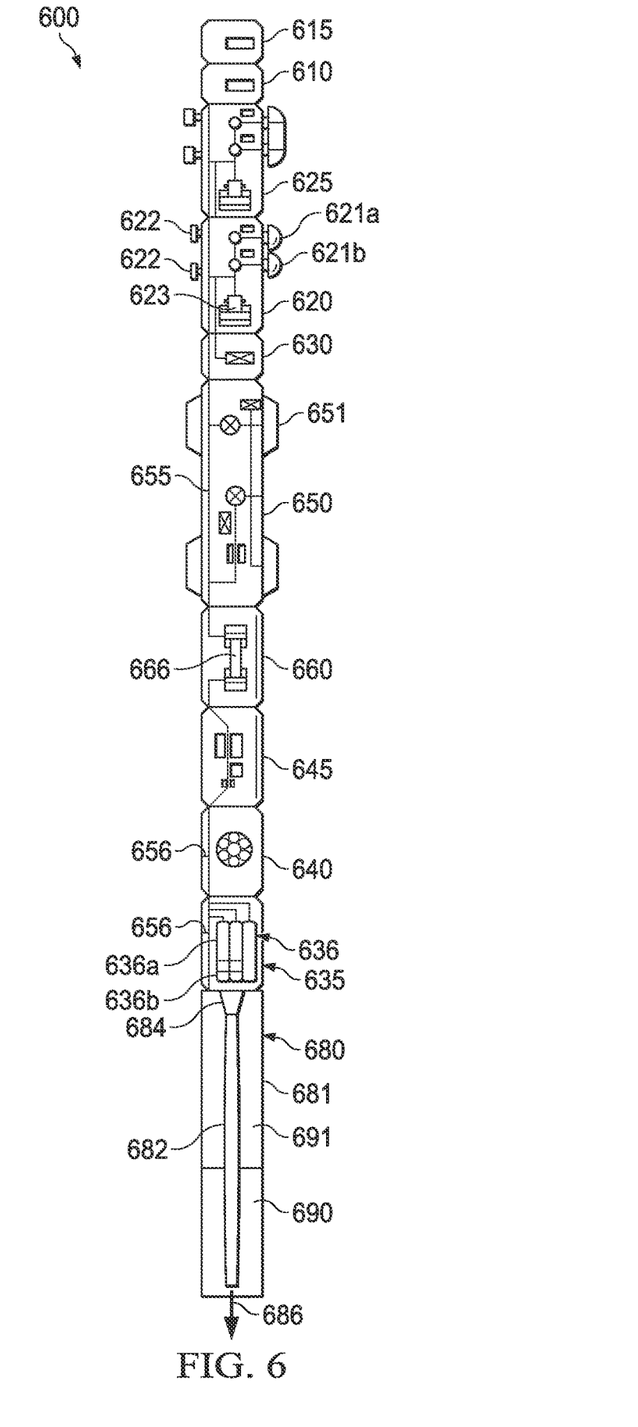
FIG. 6 is an illustration of a diagram of an example modular downhole formation tester.

FIG. 6 is an illustration of a diagram of an example modular downhole formation tester 600, for example, Halliburton Company's reservoir description tool (RDT). Formation tester 600 can be capable of testing, retrieving, and sampling along sections of a subterranean formation by means of contact with a surface of a borehole. Formation tester 600 can include one or more modules capable of performing various functions. The modules can be in various locations and orientations as part of formation tester 600. The arrangement of the modules can depend on the application or environment, and is not considered herein.

Formation tester 600 can include a hydraulic power module 610 that can convert electrical energy to hydraulic power, a telemetry module 615 that can provide electrical and data coupling and communication between the modules and an uphole control unit (not shown, such as a well site controller), a density probe-A module (DPS-A) 620 that can take samples of the formation fluids, a density probe-B module (DPS-B) 625 that can take samples for the formation fluids, a quartz gauge module (QGS-A) 630 that can perform pressure tests on the fluid sample, a multi-chamber sample collection module (MCS) 635 that can contain various size container or conduits for storing the collected target fluid samples, an integrated characterization section module (ICS) 640 that utilize photometric detection to determine an optical fingerprint or chemical nature of the target fluid, a fluid identification module (FLID) 645 that can determine the target fluid density for miscible and immiscible formation fluids, a dual-port straddle packer module (SPS) 650 that can flow a low-permeability formation while minimizing the drop in formation pressure during sampling, a flow control module (FPS) 660 that can regulate the flow of various fluids in and out of the tool, such as the target fluid, and a pulsed neutron tool module 680 that can generate the chemical signature results as described herein. Each module can include a portion of a flow line 655 that can allow target fluid, such as formation fluid, drilling fluid, and other fluids, to be pumped through formation tester 600 for potential use by each respective module.

Telemetry module 615 conditions power for the remaining tool module. Each module can have its own process-control system and can function independently or in combination with one or more other modules. Telemetry module 615 can provide a common intra-tool power bus for formation tester 600. The module order and the communication and power bus arrangement can enable one or more of the modules to be combined with other logging systems, such as a magnetic resonance image logging system or a high-resolution array induction logging system.

Formation tester 600 can be conveyed into the borehole by various means, for example, a wireline (not shown), which contains conductors for carrying power to the various modules of formation tester 600 tool, and conductors or cables for providing two-way data communication between formation tester 600 and an uphole system. In some aspects formation testers can be conveyed by a drill pipe or a drill string. In some aspects, the communication can utilize various transmission techniques, such as wireless mud pulse telemetry, wired drill pipe, and other transmission techniques.

The uphole system, such as a well site controller, can include a computer and associated memory for storing programs and data. The uphole system can direct operation of formation tester 600 and process data received from formation tester 600 during operations. The uphole system can have various associated peripherals, such as a recorder for recording data, a display for displaying desired information, printers, and other systems and equipment. In some aspects, telemetry module 615 can provide electrical and data communication between the modules and the uphole system.

FPS 660 can include a double acting piston pump, which can control the target fluid flow from the formation into flow line 655 via probe 621a and probe 621b. In some aspects, the pump operation can be monitored by the uphole system. In some aspects, target fluid entering probe 621a and probe 621b can flow through flow line 655, and can be discharged into the borehole via one or more of outlets 656. In some aspects, a fluid control device, such as a control valve, can be connected to flow line 655 for controlling the target fluid flow from flow line 655 into the borehole. Target fluid can be pumped up or down formation tester 600 with the target fluid directed into or though pump 666. Formation tester 600 can be modular. Differing sections, e.g., modules, can be arranged into different configurations including one or more duplicate sections at different locations within the stack of sections. There can be other sections not shown which can be incorporated for example, fluid PVT or phase behavior measurement sections, viscosity sections, and other compositional measurement sections. In some aspects, FPS 660 can accommodate strain-gauge pressure transducers that can measure inlet and outlet pump pressures.

QGS-A 630 can include a fluid testing device, which can analyze the target fluid flowing through flow line 655. Various suitable device or devices can be utilized to analyze the target fluid. For example, a quartz gauge carrier can be used. In some aspects, the quartz gauge carrier the pressure resonator, temperature compensation, and reference crystal can be packaged as a single unit with each adjacent crystal in direct contact. In some aspects, the quartz gauge carrier can be contained in an oil bath that is hydraulically coupled with the pressure being measured. The quartz gauge can enable measurement of various parameters, for example, a drawdown pressure of the target fluid and a target fluid temperature. In some aspects, more than one FPS 660 can be part of formation tester 600 and operate in tandem thereby allowing the pressure difference between them to be utilized to determine the target fluid viscosity during pumping or target fluid density when the target fluid flow is stopped.

MCS 635 can include various size container or conduits, e.g., chambers, for storage of the collected target fluid sample. In some aspects, MCS 635 can include at least one collection container or conduit 636 having a piston that can separate collection container or conduit 636 into a top chamber 636a and a bottom chamber 636b. A conduit can be coupled to bottom chamber 636b to provide target fluid flow between bottom chamber 636b and the outside environment such as the borehole. A fluid flow control device, such as an electrically controlled valve, can be placed in the conduit to selectively open it to allow target fluid flow between the bottom chamber 636b and the borehole. Similarly, collection container or conduit 636 can include a fluid flow control device, such as an electrically operated control valve, which can be selectively opened and closed to direct the target fluid from flow line 655 into top chamber 636a.

DPS-A 620 can include electrical and mechanical components to facilitate testing, sampling, and retrieval of target fluids from the formation, such as one or more extension probes with one or more sealing pads. The sealing pad can be in contact with the formation or formation specimen. In some aspects, an extension probe can be present with at least one elongated sealing pad providing sealing contact with a surface of the borehole at a desired location. Through one or more slits, fluid flow channels, or recesses in the sealing pad, target fluid from the sealed-off portion of the subterranean formation surface can be collected.

DSP-A 620 can include one or more setting rams 622 and can be located opposite probe 621a and probe 621b. Setting rams 622 can be laterally movable by actuators to extend away from the main body of formation tester 600. In some aspects, pretest pump 623 can be used to perform pretests on small volumes of target fluid. In some aspects, probe 621a and probe 621b can include high-resolution temperature compensated strain gauge pressure transducers that can be isolated with shut-in valves to monitor the pressure independently. In some aspects, pretest pump 623 can include a high-resolution, strain-gauge pressure transducer that can be isolated from flow line 655 and probe 621a and probe 621b. In some aspects, DSP-A 620 can include a resistance, optical, or other type of cell (not shown) located near probe 621a and probe 621b that can monitor target fluid properties immediately after entering either probe 621a or probe 621b.

Pulsed neutron tool module 680 can be attached to formation tester 600, such as located at a bottom portion of formation tester 600. Pulsed neutron tool module 680 can be sheathed in a material that can minimize high energy from the subterranean formation from entering the module, such as a sheath 681, for example, a sheath composed of tungsten. Pulsed neutron tool module 680 can include a pulsed neutron tool 682, a crossover 684 that can couple communications, energy, and telemetry, and a check valve 686. Pulsed neutron tool module 680 can have one or more target fluids in its container or conduit. For example, a first target fluid 690 can be a mud or a previous target fluid, and a second target fluid 691, such as the current target fluid or formation fluid, e.g., oil.

In some aspects, a pump down configuration can cause target fluid from MCS 635 to flow across pulsed neutron tool 682. In some aspects, sheath 681 can form a container or a conduit for the target fluid and be flush with formation tester 600 such that target fluid from MCS 635 fills sheath 681, and the target fluid can be flushed through sheath 681 throughout the pump out process. Sheath 681 can shield pulsed neutron tool 682 against the subterranean formation and borehole such that pulsed neutron tool 682 is primarily sensitive to the target fluid flowing through sheath 681 and not from fluid or material external to sheath 681. Sheath 681 can function as a container or a conduit to isolate one target fluid from another target fluid, can function as a means of scattering neutrons in order to increase the number of thermal neutrons created, such as for capture purposes, or can function to shield the neutron detectors from gamma rays created by atoms that are external to sheath 681.

Pulsed neutron tool 682 can generate an elemental composition, e.g., generate a chemical signature result, of the target fluid during the pump out process. In some aspects, prior to a pump out process event, the pump can be reversed in order to flush sheath 681, for example, by utilizing an internal tube to push the target fluid to the top of sheath 681.

In some aspects, sheath 681 can include a valve to divert flow to the top or bottom of sheath 681 through an internal flow line. Utilizing the density of the target fluid external of sheath 681 with respect to the target fluid contained in sheath 681, the target fluid flow can be diverted to the top or bottom of sheath 681 in order optimize the flushing of sheath 681. In some aspects, the chemical signature results that can be output by pulsed neutron tool module 680 can be leveraged as raw data by other systems.

One or more of the modules that are part of formation tester 600 can be utilized to generate a matrix of element parameters. In some aspects, the matrix of element parameters can then be utilized as an input to calibrate pulsed neutron tool 682, source waveguides, detector waveguides, or other tools and sensors. In some aspects the matrix of element parameters can be utilized to adjust or calibrate the generated chemical signature results, such as correcting for a sodium concentration intensity.

The matrix of element parameters can be generated from one or more sensor inputs, for example, temperature, pressure, density, and other measured factors. The matrix of element parameters can be determined from measurements taken downhole, a laboratory environment, or a controlled environment. The matrix of element parameters can provide information on how one or more elements or compounds behave, react, or present itself under different environment conditions. When the downhole environment conditions are known or partially known, the matrix of element parameters can be utilized to modify the measurements collected by pulsed neutron tool 682, a detector waveguide, or other sensor to correct the measurements against the environment conditions.

Transfer function techniques, such as, but not limited to, calibration transfer functions based on machine learning models or other flexible models with or without constraints, can be utilized to perform the calibration process on varying devices or sensors, and the calibration can be performed on devices or sensors different than that utilized downhole. Calibration techniques can preselect a diversity of measurements collected previously and develop a response function, for example, represented by a surface or a curve, for the measurement sensor.

The diversity of measurements that form the matrix of element parameters can be matrix matched in real-time, near real-time, or prior to the execution of a portion of a borehole operation plan. Pattern matching techniques and classification techniques utilizing one or more of the direct sensor measurements, or other sensor measurements including that of the elemental detection system described herein on the same sample, can be employed. For example, in some aspects, target fluids can utilize a fluid density parameter, a temperature parameter, a pressure parameter, or a chemical composition parameter. In some aspects, physical properties such as a viscosity parameter, a resistivity parameter, a capacitance parameter, NMR, a bubble point parameter, a gas to oil ratio parameter, or other properties and parameters for the existing depth, offset depths, or offset wells, can be utilized as sensor measurements to select adjustment, e.g., calibration, parameters from the matrix of element parameters. In some aspects, such as for fluid or solid material, an acoustic measurement, an ultrasonic measurement, a resistivity measurement, a nuclear magnetic resonance measurement, a cutting measurement, an offset well measurement, or other depth measurements can be utilized as measurements to select adjustment, e.g., calibration, parameters from the matrix of element parameters.

The calibration technique can be linear or nonlinear as developed by multiple techniques physical, semi-empirical, or empirical by conventional or machine learning techniques. Machine learning techniques can include genetic algorithms, neural networks, Gaussian processing, and other techniques. In some aspects, machine learning techniques can be used to develop calibration transfer models for analogous sensors to the target sensor.

The processes disclosed can be utilized by SPS 650 or other formation tester 600 module that is capable of using one or more microprobe collimators on an extension probe, such as an extension probe 651. Extension probe 651 can make contact with a subterranean formation. In some aspects, other probes can be utilized to make contact with the subterranean formation, for example, a dual packer section. In some aspects, a combination of probes can be utilized to perform the contact with the subterranean formation. SPS 650 can include pumps or flow lines. The pumps can be operated to withdraw fluid from the formation, or to inject fluid into the formation. Injected fluid can be fluid stored and carried downhole, or can be borehole fluid such as drilling fluid mud. The mud can be filtered or partially filtered prior to injection. Formation tester 600 can operate under multiple methods of fluid withdraw from the subterranean formation, fluid injection to the subterranean formation, or combinations thereof.

The microprobe collimators on extension probe 651 can perform the processes as described for the source waveguide. The collected measurements can provide a contact surface elemental composition of the subterranean formation. In some aspects, multiple microprobes can be used with one detector waveguide to generate a larger average elemental composition for the chemical signature results. In some aspects, multiple microprobes can be used in an array or matrix of detector waveguides to generate an image of the subterranean formation utilizing the chemical signature results, e.g., elemental composition.

In some aspects, the microprobe collimators and detectors can be utilized to measure the composition of the borehole mud system or borehole fluid system, for example, when filtered mud is flowed past the sensor. In some aspects, a result of the measurement can be used for pumped comparisons. In some aspects, the borehole chemical signature result can include an image that can be used for stratigraphy or chemostratigraphy to match with other boreholes or well systems, can be used to determine the subterranean formation type at the measured location, can be used to compare to other measurements such as wireline nuclear logs or surface cuttings, or can be used for analysis with core samples. In some aspects, the chemical signature results can be used to select core sample locations, for example, if a coring system is run on the same drill string or wireline as the subterranean formation sensors, such as formation tester 600. Selection criteria for coring can be to maximize information retrieval from core samples or to target specific predetermined information content. The selection can be made by various machine learning or pattern recognition techniques in order to optimize the core sampling objectives.

Figure 7:
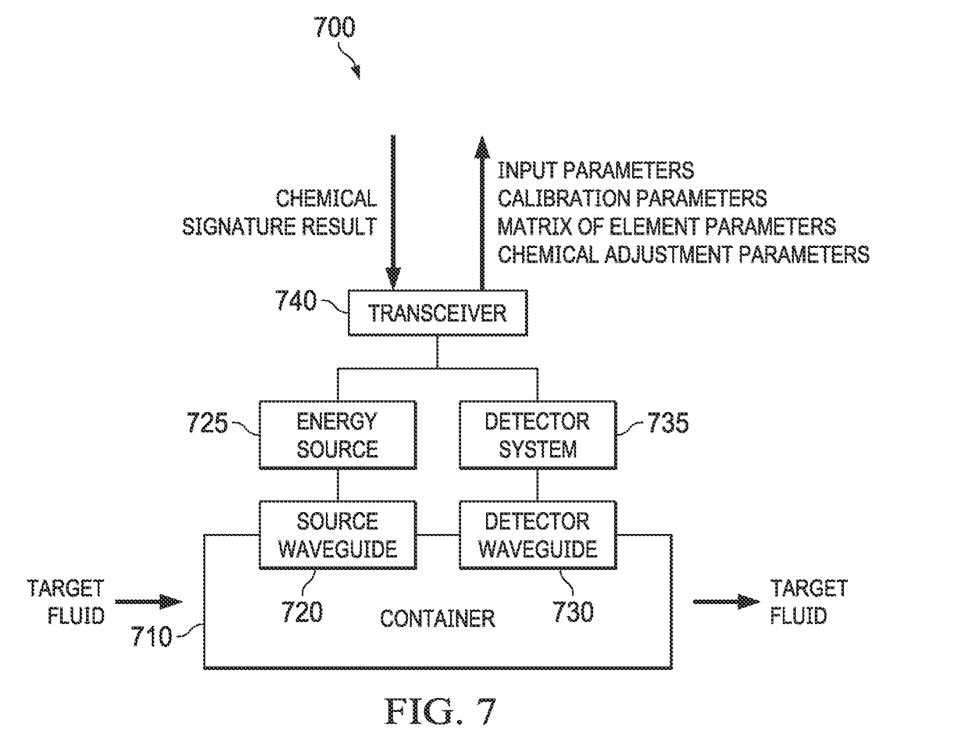
FIG. 7 is an illustration of a block diagram of an example fluid composition detection system.

FIG. 7 is an illustration of a block diagram of an example fluid composition detection system 700. Fluid composition detection system 700 can utilize waveguides as described in FIGS. 4A and 4B using an orientation as described in FIG. 5. Fluid composition detection system 700 can be utilized, for example, on part of a flow line in a downhole location, such as in a hydrocarbon well system. The system can enable a chemical signature result, e.g., chemical fingerprint, of the target fluid, e.g., drilling fluid filtrate to be distinguished from that of formation fluid for aqueous pump outs. In some aspects, the chemical signature result can be utilized to determine a drilling fluid filtrate contamination in the formation fluid. Actions can be taken utilizing the contamination percentage result. In some aspects, a sampling decision can be enacted if the contamination percentage is sufficiently low, for example, below 10.0 percent, below 5 percent, or below another value depending on the application and operational parameters.

In some aspects, the target fluid chemical signature result can be determined for reference to laboratory values to ensure sample integrity with respect to phase separation and scaling. In some aspects, a salinity value can be determined for the target fluid. In some aspects, the amount of sodium can be determined, for example, directly with low resolution or by chloride difference with respect to potassium, calcium, and magnesium. In some aspects, a bromide compound, a zinc compound, an iodide compound, a cesium compound, or other elemental compounds, are common components of drilling fluid filtrate not found in significant abundance in formation fluids and can be used as tracers for aqueous target fluids.

Fluid composition detection system 700 includes a container or a conduit 710, a source waveguide 720, e.g., source controller, a detector waveguide 730, an energy source 725, a detector system 735, and a transceiver 740. In some aspects, container or conduit 710 can be a container or a conduit that is part of a downhole tool, such as a BHA or a formation tester. In some aspects, container or conduit 710 can be a fluid pipe where extracted or pumped target fluid is pumped through the fluid pipe. In some aspects, container or conduit 710 can be a container or a conduit along a fluid pipe, for example, a fluid pipe through a formation tester or a storage tank. In some aspects, container or conduit 710 can be a portion of an extension probe with microprobe collimators that can make contact with the subterranean formation. In this aspect, container or conduit 710 can be a portion of a container or a conduit, for example, a cup that can be placed against the subterranean formation. Target fluid can be flushed or pumped into or through container or conduit 710 where the measurements can be collected.

In some aspects, source waveguide 720 and detector waveguide 730 can be waveguides that include optic capillaries, for example, polycrystalline capillaries. In some aspects, source waveguide 720 can be a set of source waveguides. In some aspects, detector waveguide 730 can be a set of detector waveguides. In some aspects, source waveguide 720 and detector waveguide 730 can be a set of waveguides, and additional sets of waveguides can be present. In this aspect, each set of waveguides can be located a different location along the container or conduit. In some aspects, source waveguide 720 and detector waveguide 730 can be combined into a pulsed neutron tool. In some aspects, source waveguide 720 and detector waveguide 730 can be the same waveguide or part of a waveguide, for example a waveguide that includes the source and detector portions.

Source waveguide 720 has a first end coupled to high energy source 725, for example, an x-ray source, a gamma ray source, a pulsed neutron source, or other energy sources. Source waveguide 720 has a second end that can emit the high energy, e.g., focused emitted energy. Detector waveguide 730 has a first end that is coupled to detector system 735 and a second end capable of detecting high energy. Detector system 735 can collect measurements from detector waveguide 730. In some aspects, detector system 735 can perform analysis and calculations on the collected measurements. In some aspects, detector system 735 can generate chemical signature results. High energy source 725 and detector system 735 are coupled to transceiver 740. High energy source 725, detector system 735, and transceiver 740 can be combined or separated in various combinations, for example, combining transceiver 740 and detector system 735.

Transceiver 740 can be one or more transceivers, for example, if high energy source 725 and detector waveguide 730 utilize separate transceivers. Transceiver 740 can communicate with one or more other systems, for example, other tools or systems with the downhole tools, BHA, or formation tester, or other systems at a surface location, for example, a well site controller or computing system. Transceiver 740 can receive data, parameters, and instructions, for example, receiving input parameters, calibration parameters, chemical adjustment parameters, or matrix of element parameters. Transceiver 740 can transmit parameters, status, the collected measurements, analysis, or chemical signature results to one or more other systems.

Calibration parameters can be utilized by fluid composition detection system 700 to calibrate the system against known samples, such as samples analyzed in a laboratory or controlled environment. Chemical adjustment parameters can be utilized to adjust the chemical signature result. For example, a calibration curve for an element can be determined for differing hydrocarbon environments, such as diesel and bio-diesel. The calibration curve can be determined in a laboratory or other controlled environment. The chemical adjustment parameter can be a corrected intensity factor that can be applied to the generated chemical signature result, for example, to correct for environmental factors.

In some aspects, a matrix of element parameters can be determined using a laboratory or controlled environment to generate correction factors that can be applied to the chemical signature result. In some aspects, the matrix of element parameters can be determined downhole, such as using a formation tester or other sensors. In some aspects, the matrix of element parameters can be developed using a combination of downhole tool sensors and controlled or laboratory environment parameters. For example, a formation tester can include temperature and pressure sensors, magnetic resonance sensors, or other sensor types. The collected sensor information can be utilized in conjunction with the collected measurements from detector waveguide 730 to adjust the chemical signature result to correct for the environment factors measured by the various sensors.

Fluid composition detection system 700 represents a functional demonstration of the processes as described herein. The various functions can be combined in various combinations, for example, source waveguide 720 and detector waveguide 730 can be the same waveguide, and transceiver 740 can be combined with high energy source 725 and detector system 735.

Figure 8:
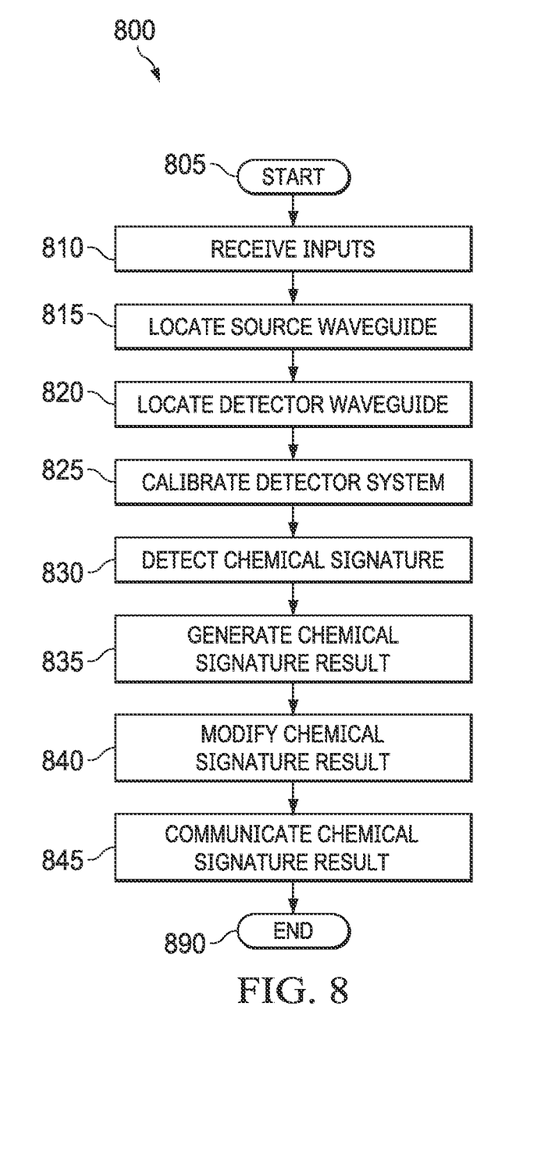
FIG. 8 is an illustration of a flow diagram of an example method for detecting elemental composition of a target fluid.

FIG. 8 is an illustration of a flow diagram of an example method 800 for detecting elemental composition of a target fluid. Method 800 demonstrates one aspect of use where the source waveguide and the detector waveguide are located along a fluid pipe at a downhole location. Method 800 starts at a step 805 and proceeds to a step 810. In step 810, inputs can be received, such as instructions on when to operate, chemical adjustment parameters, matrix of element parameters, calibration parameters, and other input parameters.

In a step 815, the source waveguide can be positioned, located, or oriented. In some aspects, the source waveguide can be at a fixed location and orientation to a container or a conduit. In some aspects, the source waveguide can be at a fixed location and be able to alter its orientation relative to the container or the conduit utilizing environment factors, for example, the type of target fluid being analyzed. In some aspects, the source waveguide can be attached to a moveable arm, such as an extension probe allowing the location and orientation of the source waveguide to be adjusted.

In a step 820, the detector waveguide can be positioned, located, or oriented. In some aspects, the detector waveguide can be at a fixed location and orientation to a container or a conduit. In some aspects, the detector waveguide can be at a fixed location and be able to alter its orientation relative to the container or the conduit utilizing environment factors, for example, the type of target fluid being analyzed. In some aspects, the detector waveguide can be attached to a moveable arm, such as an extension probe allowing the location and orientation of the detector waveguide to be adjusted. In some aspects, the detector waveguide can be the source waveguide or be a portion of the source waveguide.

In a step 825, the fluid composition detection system can be calibrated. This is an optional step. The system can utilize the received calibration parameters to calibrate the various components of the system. Proceeding to a step 830, high energy can be emitted from the source waveguide and detected by the detector waveguide and then communicated to a detector system. The detector system can collect the measurements from the emitted high energy.

In a step 835, the detector system can generate a chemical signature result. This is an optional step. In some aspects, the collected measurements can be communicated to another system, for example, a well site controller, and the receiving system can generate the chemical signature results. In a step 840, if chemical adjustment parameters or a matrix of element parameters was received, the detector system or the other system receiving the collected measurements can utilize the chemical adjustment parameters or a matrix of element parameters to adjust the chemical signature result. This step can correct for downhole environment conditions, the type of target fluid, and other factors experienced at the point of measurement.

In a step 845, the chemical signature result can be communicated to another system, for example, a well site controller, a user, an operator, or other system or person. The received information can be utilized to adjust an operation plan of the borehole. For example, if a water-oil barrier is detected, a geo-steering system can alter drilling operations and direction. Method 800 ends at a step 890.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple, or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the disclosed aspects in the SUMMARY section can have one or more of the following additional elements in combination. Element 1: wherein a first end of the energy detector is coupled to a detector system operable to collect measurements of neutrons, and the detector system is located external of the container. Element 2: wherein the radiant energy source is a pulsed neutron tool and includes a pulsed neutron source. Element 3: a crossover coupled to an upper end of the container, wherein the crossover couples the radiant energy source to a MCS. Element 4: a second fluid flow control device attached to an uphole end of the container to allow the target fluid to flow from the MCS to the container and the first fluid flow control device allows the target fluid to flow out of the container. Element 5: wherein the sheath is composed of one or more of a tungsten or a high Z material. Element 6: wherein the target fluid includes more than one target fluid, and each target fluid in the more than one target fluid is contained in a separate chamber of the container. Element 7: wherein the source controller is part of the energy detector. Element 8: wherein the energy detector is a pulsed neutron tool. Element 9: wherein the detector system is located at a surface location. Element 10: a transceiver, capable of communicating the high energy measurements or the chemical signature result from the detector system to a well site controller or a computing system. Element 11: wherein the sheath is capable of scattering neutrons increasing a number of thermal neutrons. Element 12: wherein the chemical signature result specifies the one or more target fluids as one or more of an oil, a gas, a borehole fluid, a formation fluid, a drilling fluid, a mud, a hydraulic fluid, a fracturing fluid, a brine, a chemical additive, or a contamination percentage of the drilling fluid present in the formation fluid. Element 13: one or more fluid flow control devices capable of controlling an inflow or an outflow of the one or more target fluids from the container. Element 14: a crossover capable of coupling the container to other tools for energy, telemetry, and communications. Element 15: wherein the container includes an internal flow line to divert the one of the one or more target fluids to a top end of the container or a bottom end of the container. Element 16: wherein the container, the sheath, the source controller, and the energy detector are a first pulsed neutron system and the system includes one or more additional pulsed neutron systems, each at a different location relative to the first pulsed neutron system. Element 17: wherein the chemical signature result includes an elemental composition for elements with an atomic number for sodium or higher. Element 18: wherein the one or more target fluids is an oil, and the chemical signature result includes an elemental composition of one or more of Sulfur, Nickel, Vanadium, Iron, Cobalt, or Mercury. Element 19: wherein the one or more target fluids is a water, and the chemical signature result includes an elemental composition of one or more of Sodium, Potassium, Cesium, Magnesium, Calcium, Chlorine, Bromine, Iodine, Sulfur, or Mercury. Element 20: communicating the chemical signature result to one or more of a computing system, an uphole system, or a well site controller.

What is claimed is:

1. An apparatus, comprising:
   a container, attached to a drill string or a downhole formation tester, wherein the container is located within a borehole;
   a first fluid flow control device attached to the container to allow a target fluid to flow out of the container;
   a radiant energy source, capable to generate an emission energy;
   an energy detector, capable to detect the emission energy; and
   a sheath at least in part positioned proximate the target fluid, wherein the sheath reduces high energy from outside of the container being detected within the container by the energy detector.

2. The apparatus as recited in claim 1, wherein a first end of the energy detector is coupled to a detector system operable to collect measurements of neutrons, and the detector system is located external of the container.

3. The apparatus as recited in claim 1, wherein the radiant energy source is a pulsed neutron tool and includes a pulsed neutron source.

4. The apparatus as recited in claim 1, further comprising:
   a crossover coupled to an upper end of the container, wherein the crossover couples the radiant energy source to a multi-chamber sample collection module (MCS).

5. The apparatus as recited in claim 4, further comprising:
   a second fluid flow control device attached to an uphole end of the container to allow the target fluid to flow from the MCS to the container and the first fluid flow control device allows the target fluid to flow out of the container.

6. The apparatus as recited in claim 1, wherein the sheath is composed of one or more of a tungsten or a high Z material.

7. The apparatus as recited in claim 1, wherein the target fluid includes more than one target fluid, and each target fluid in the more than one target fluid is contained in a separate chamber of the container.

8. A system, comprising:
a container, capable of containing one or more target fluids, wherein the container is located downhole in a borehole;
a sheath, at least in part positioned proximate the one or more target fluids, capable of reducing an amount of high energy from atoms external to the sheath from reaching the one or more target fluids;
a detector system, capable of determining a chemical signature result of the one or more target fluids;
a source controller, capable of emitting a radiant energy; and
an energy detector, capable of detecting the radiant energy reflected off of the one or more target fluids as high energy measurements, wherein the energy detector is located within the container, and where the energy detector communicates the high energy measurements to the detector system.

9. The system as recited in claim 8, wherein the source controller is part of the energy detector.

10. The system as recited in claim 8, wherein the energy detector is a pulsed neutron tool.

11. The system as recited in claim 8, wherein the detector system is located at a surface location.

12. The system as recited in claim 8, further comprising:
a transceiver, capable of communicating the high energy measurements or the chemical signature result from the detector system to a well site controller or a computing system.

13. The system as recited in claim 8, wherein the sheath is capable of scattering neutrons increasing a number of thermal neutrons.

14. The system as recited in claim 8, wherein the chemical signature result specifies the one or more target fluids as one or more of an oil, a gas, a borehole fluid, a formation fluid, a drilling fluid, a mud, a hydraulic fluid, a fracturing fluid, a brine, a chemical additive, or a contamination percentage of the drilling fluid present in the formation fluid.

15. The system as recited in claim 8, further comprising:
one or more fluid flow control devices capable of controlling an inflow or an outflow of the one or more target fluids from the container.

16. The system as recited in claim 8, further comprising:
a crossover capable of coupling the container to other tools for energy, telemetry, and communications.

17. The system as recited in claim 8, wherein the container includes an internal flow line to divert the one of the one or more target fluids to a top end of the container or a bottom end of the container.

18. The system as recited in claim 8, wherein the container, the sheath, the source controller, and the energy detector are a first pulsed neutron system and the system includes one or more additional pulsed neutron systems, each at a different location relative to the first pulsed neutron system.

19. The system as recited in claim 8, wherein the chemical signature result includes an elemental composition for elements with an atomic number for sodium or higher.

20. The system as recited in claim 8, wherein the one or more target fluids is an oil, and the chemical signature result includes an elemental composition of one or more of Sulfur, Nickel, Vanadium, Iron, Cobalt, or Mercury.

21. The system as recited in claim 8, wherein the one or more target fluids is a water, and the chemical signature result includes an elemental composition of one or more of Sodium, Potassium, Cesium, Magnesium, Calcium, Chlorine, Bromine, Iodine, Sulfur, or Mercury.

22. A method, comprising:
locating an energy detector internal of a container, wherein the container is located downhole a borehole, and the energy detector is operable to detect radiant energy, and the container is operable to hold one or more target fluids and the container includes a sheath at least in part proximate the one or more target fluids, where the sheath is operable to reduce an amount of the radiant energy from atoms external to the sheath from reaching the energy detector;
locating a source controller proximate the container, operable to generate the radiant energy;
detecting one or more measurements from the one or more target fluids using the energy detector and the source controller; and
generating a chemical signature result utilizing the one or more measurements, wherein the generating is performed by a detector system communicatively coupled to the energy detector.

23. The method as recited in claim 22, further comprising:
communicating the chemical signature result to one or more of a computing system, an uphole system, or a well site controller.

* * * * *